(No Model.)

S. OGDEN.
PROCESS OF WATERPROOFING TRACES AND BANDS.

No. 390,248. Patented Oct. 2, 1888.

WITNESSES:
Wm. A. Rosenbaum
G. H. Stockbridge

INVENTOR
Samuel Ogden
BY
W. J. Johnston
ATTORNEY

UNITED STATES PATENT OFFICE.

SAMUEL OGDEN, OF MANCHESTER, COUNTY OF LANCASTER, ENGLAND.

PROCESS OF WATERPROOFING TRACES AND BANDS.

SPECIFICATION forming part of Letters Patent No. 390,248, dated October 2, 1888.

Application filed August 25, 1887. Serial No. 247,813. (No specimens.)

*To all whom it may concern:*

Be it known that I, SAMUEL OGDEN, a subject of the Queen of Great Britain, and a resident of Manchester, in the county of Lancaster, England, have invented certain new and useful Improvements in Traces and Haulage-Bands, of which the following is a specification.

This invention relates to textile and woven traces and haulage-bands employed for traction, haulage, and analogous purposes; and it has for its object to render such traces and bands more durable and incapable of being prejudicially affected by moisture, water, and atmospheric exposure.

These improvements consist in saturating, coating, painting, enameling, or otherwise similarly treating the traces and bands with the hereinafter-described or similar compounds successively applied. First, the traces and bands are painted, coated, or saturated with a wax compound; second, with a siccative compound, and third with a stiff paint.

Figure 1:
Figure 2:
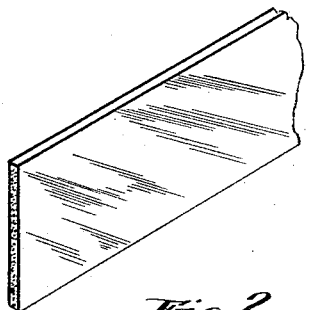

In the accompanying drawings, Figure 1 represents a trace, and Fig. 2 a portion of a band.

The wax compound consists of beeswax, with which there is intimately mixed while the wax is in a molten condition sufficient plumbago to form a working paste when the compound is applied hot. For beeswax paraffine, ozokerite, or vegetable wax may be substituted, and the hardness of the compound may be increased by the addition of hard vegetable wax or ozokerite, or be reduced by the addition of vaseline or heavy mineral oil. This compound is applied hot and preferably while the trace or band is at a similar temperature. The siccative compound consists of, raw linseed oil, about seventy-five parts; boiled linseed-oil, about twenty-five parts, with which there is ground or intimately mixed sufficient of the following finely-powdered mixture to form a creamy paste; litharge, about eight parts; red lead, about two parts. The relative proportions of the mixed oils and of the mixed powders, respectively, may be varied within considerable limits, but the hereinbefore-given proportions are suitable for my ordinary purposes and practice. This compound should be allowed to become dry before the application of the stiff paint.

The stiff paint consists of Prussian blue ground or intimately mixed and boiled with a sufficient quantity of raw linseed-oil to form a paste.

After the application of the stiff paint the traces or bands should be dried by artificial means. If the painted surface becomes dull in consequence of exposure, the gloss may be restored by dry rubbing with a soft cloth or leather.

Woven traces and bands prepared and treated according to these improvements have many times the strength of leather, and when exposed to rain, or even when absolutely immersed in water for a long period, do not lose any of their tensile strength, durability, pliability, or firmness, and are not in any way injured.

Having now described my invention, what I claim is—

1. The process of treating textile and woven traces and bands, consisting, first, in the application of a compound of plumbago and a wax; second, in the application of a compound of the oxides of lead and linseed-oil, and, third, in the application of a stiff paint mixture, whereby the said traces are rendered more durable and less liable to be affected by moisture and the atmosphere.

2. In the process of treating textile and woven traces and bands, the application of a wax and plumbago and a subsequently-applied siccative compound composed of oxide of lead and linseed-oil, for the purpose of rendering them more durable, as set forth.

In testimony that I claim the foregoing as my invention I have signed my name, in presence of two witnesses, this 23d day of June, 1887.

SAMUEL OGDEN.

Witnesses:
JAMES C. FISHER,
WILLIAM E. HEYS.